United States Patent Office

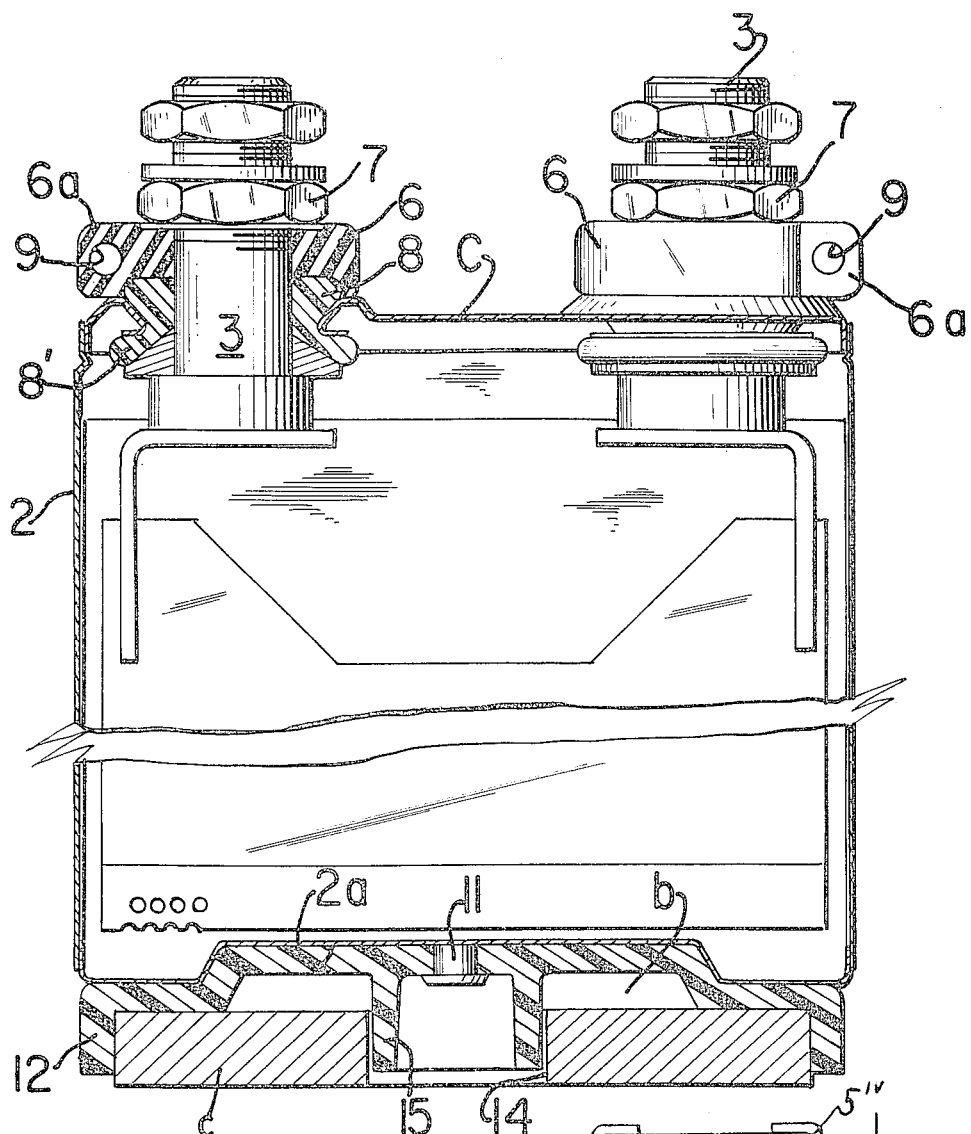
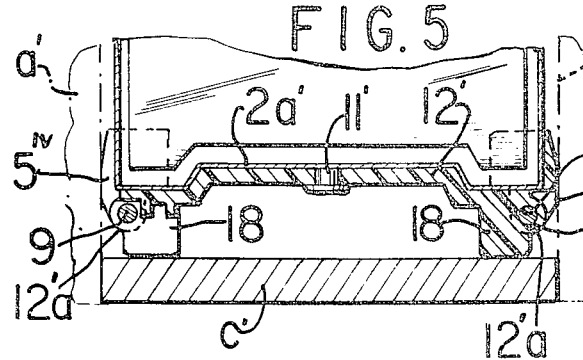

3,692,588
Patented Sept. 19, 1972

3,692,588
ARRANGEMENT FOR ASSEMBLING STORAGE CELLS IN BATTERIES
Pierre Chamodon, Bordeaux, France, assignor to Societe des Accumulateurs Fixes et de Traction (Societe Anonyme) Pont de la Folie, Romainville, Seine-Saint-Denis, France
Filed June 19, 1970, Ser. No. 47,670
Claims priority, application France, June 27, 1969, 6921648
Int. Cl. H01m 1/04
U.S. Cl. 136—171                    20 Claims

ABSTRACT OF THE DISCLOSURE

An arrangement for assembling storage cells in batteries, so as to maintain them spaced apart side by side and insulated from each other in a supporting rack, including corner members of insulating material mounted on the cell terminal posts over the cell covers which embrace side faces at the cell corners and abut side parts of the rack and adjacent corner members of adjacent cells to space the cells apart for air circulation as well as to insulate them from each other. The bottom of each cell is also insulated and spaced from a bottom part of the rack by an insulating member centered with respect to the cell casing bottoms and means associated with it to prevent longitudinal and lateral translation of the cells relative to each other and base parts of the rack.

BRIEF SUMMARY OF THE INVENTION

This invention relates to a device or arrangement for assembling storage cells in batteries carried by a rack. It is more especially suitable for cells with metal casings, such as alkaline cells.

Among the methods for assembling alkaline cells in batteries it is already known to suspend them side by side but separated from each other by a gap, by means of plugs fastened to the casings, each plug being capped by an insulating overplug and engaging in sockets provided in the side walls of an insulating rack, e.g. made of wood. This solution involves a number of drawbacks more especially caused by the necessity of fastening at least two plugs upon the casing at suitable places on each casing to face opposite the said side walls of the rack. Moreover, the casing and the plugs which are generally made of steel sheet must be carefully nickel-coated before mounting the plugs on the casings in order to prevent the corrosion resulting from contact and collection of alkaline solutions between the casing wall and a non-nickel-coated or unevenly coated plug. As a consequence, the welding of the plugs onto the casing must be carried out with precaution so that the protective nickel coating thereof is not destroyed.

In such a battery of cells the metal casings of the various cells must also be insulated from each other which requires the use of insulating side walls for the rack or at least the insulation of the casings from these walls. Moreover, the casings must not directly rest upon the bottom of the rack where spilt electrolyte may collect which would risk short circuiting the cells via their bottom walls.

In order to realize this insulation of the side and bottom walls of the cells while eliminating the holding plugs, it has already been disclosed in the French Pat. 1,551,232, filed Nov. 16, 1967 to close the casing with a plastic cover provided with protruding corners and to wedge or space the outer bottom wall of the casing from the rack with an insulating plastic part fitting the rack bottom, so that the cells are well adjusted and spaced both at their tops as at their bottoms. The cover and this bottom part were maintained in position by elastic straps.

An object of this invention is to dispense with the need for use of holding plugs and also to simplify the battery construction.

According to a feature of this invention, at least the corners of the casing cover are each provided with an insulating corner member fitting the cover shape and ensuring the wedging and spacing of the cells both laterally and longitudinally in the rack, as well as effecting insulation both between cells and between the cells and the rack walls.

Optionally, the lower corners of the casing are also provided with insulating members of the same shape.

According to a preferred embodiment, the corner members are unified with the upper part of the cell and carried thereby by means of the cell terminal posts or by members secured on these posts, the latter solution being preferred so that only one size of the corner members need be used for any size of cells or at least for the greatest possible number of cell sizes. Actually, there are right-sided and left-sided corner members for each cell. The solution according to the invention is particularly advantageous when the cup-shaped cover is welded to the casing in such a manner that the outer bottom of the cover cup is located and visible at the top of the cell casing.

According to another feature and characteristic of the present invention, the insulation between the casing and the rack bottom is ensured by a plastic plate preferably engaged and positioned in a recessed part of the said casing bottom and dimensioned so that it ensures spacing or wedging and insulation of the lower part of the cell from the bottom part of the rack.

According to another embodiment, corner members situated on the lower corners of the casing are carried by and united with a plastic plate secured to the bottom of the casing and ensuring spacing and insulation of the lower parts of the cell from the bottom parts of the rack.

Other objects and features of the invention will become apparent from the annexed drawings given as non-limitative examples as an aid in understanding how the invention may be practiced, the particulars found both in the drawings and in the detailed description being, of course, part of the said invention.

In the drawings:

FIG. 3 is a partly sectionalized elevational view of a cell embodying the invention;

FIG. 5 is a fragmentary sectional view taken along line 5—5 of FIG. 6 of a modified structure for spacing the lower portions of cells in a supporting rack; and FIG. 6 is an upper plan view similar to FIG. 1 of the modification of FIG. 5.

DETAILED DESCRIPTION

Figure 1:
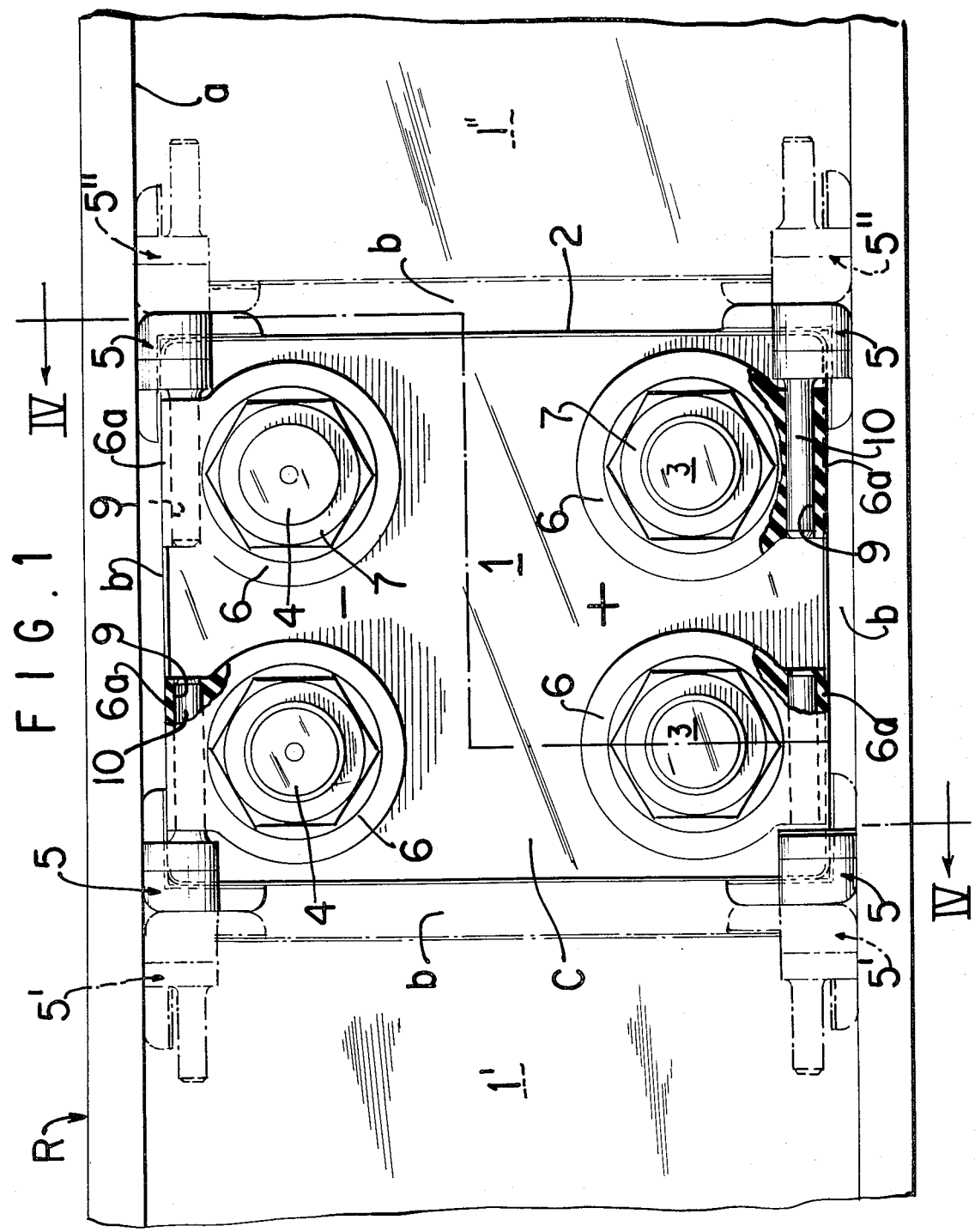
FIG. 1 shows a plan view of part of a battery mounted in its racks.

In FIG. 1 a storage cell 1 of substantially parallelepiped shaped is shown having metal casing 2, this cell having two terminal posts of each polarity, respectively 3 and 3', 4 and 4', projecting outwardly of its cover C. As is apparent in this figure, each of the four corners of the cover is provided with an insulating plastic member such as 5, shaped as a trihedron engaging the respective upper corners of the casing. These insulating corner members 5 are in contact on one of their faces with side wall parts $a$ of the rack R supporting a group of cells 1 as a battery, and on another of their respective faces with similar corner members 5' or 5" fitted on the adjacent cell 1' or 1" shown only in part in FIG. 1. This figure shows an important advantage of the device according to the invention, which is the creation on the four faces of each cell casing, between each cell and the rack side walls or parts a, as well as between this cell and the adjacent cells, of the gaps b constituting channels allowing the free circulation of air, and, therefore, an adequate cooling of the battery. The width of these channels or gaps b depends on the thickness of the corner members. A gap thickness between cells of a few millimeters will generally be enough.

Figure 4:
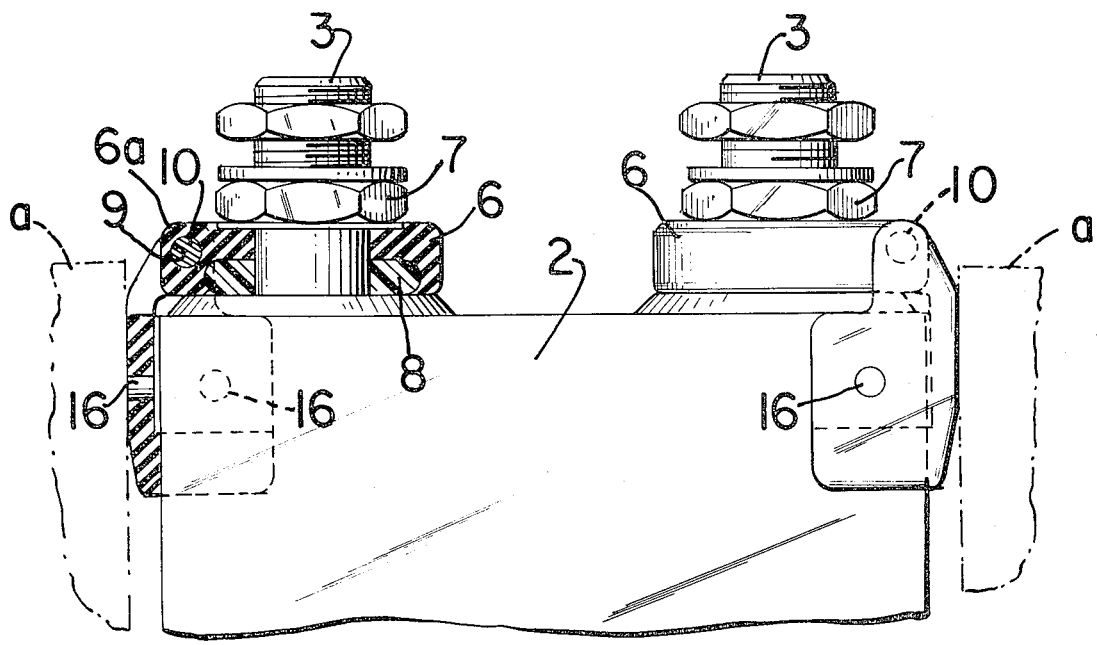
FIG. 4 is a partly sectional view along the line IV—IV of FIG. 1 of a casing corner equipped with the device according to the invention.

In order to understand how the corner members are unified with the cell, reference is made to FIGS. 3 and 4.

On each cell terminal post such as 3 is mounted a disc 6, made of insulating material. This disc squeezed or compressed by the tightening of nut 7 on the said post 3 presses on an underlying O-ring 8 provided with a skirt 8' ensuring the sealing of the cell and the insulation of each post from the cover and casing 2. This disc 6 is provided with a lateral protuberance or flange 6a comprising an opening 9 in which a rod 10 is insertable which is an appendix of each corner member 5.

It may be seen that when the cell is being assembled the discs 6 need only be placed so that their protuberances or flanges 6a are suitably located, which may be automatically obtained, e.g. by means of a frame (not shown), the nuts 7 are then tightened on the terminal posts, and then the corner members 5 are positioned by driving their rods 10 into the cylindrically shaped openings 9 where they can be fastened either by a tight fit, or elastically, or again by gluing or welding.

Figure 2:
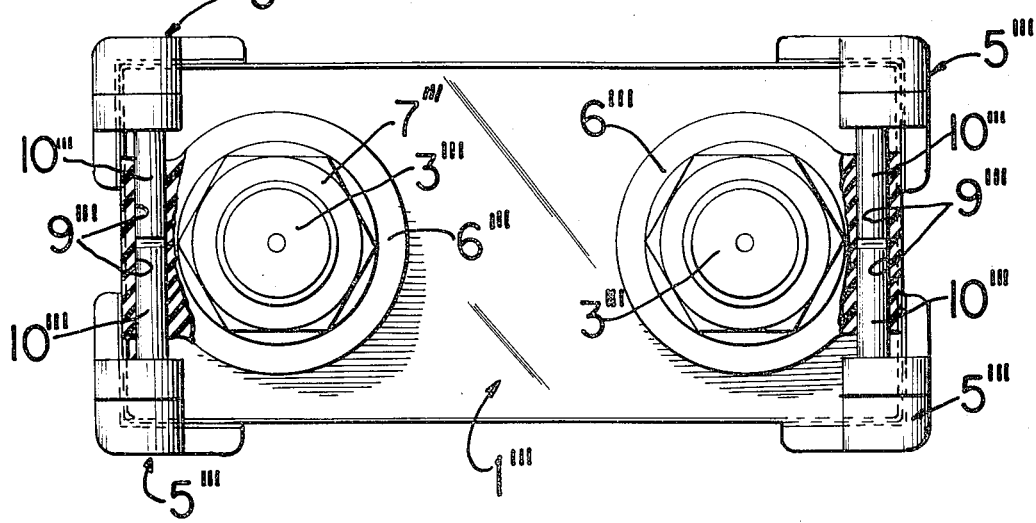
FIG. 2 is a similar fractional view of another embodiment.

As seen in FIG. 2, where the cell 1''' is of relatively narrow width each disc 6''' on a terminal post 3''' has its protuberance or flange 6a''' provided with an opening 9''' extending its full length so that the rods 10''' of a pair of corner members 5''' may be inserted into said opening from its opposite ends for support thereby. The ring 6''' is clamped on post 3''' by clamping nut 7'''. Thus, two opposite corners of the cell 1''' may be equipped with corner members 5''' supported from a single post 3'''.

FIG. 3 shows how the spacing or wedging and insulation are effected at the lower portions of the cell casing with respect to the bottom part of the rack R. Such casing bottom is provided with a recess 2a preferably at the center of which is welded a teat 11 onto which is force fited a plastic plate 12, the shape and thickness of which is such that wedging or spacing is ensured between the rack base part or plate c. The latter also is provided with an aperture 14 into which a protuberance 15 of the plastic plate 12 fits. The engagement in this aperture 14 of said protuberance 15 thus prevents longitudinal or lateral displacement of the individual cells at their bottoms and the plate 12 thus serves to space the cell bottom from the base plate c. Thus, also the bottom ends of the cells are kept spaced apart by widths or gaps b to substantially the same extent as is provided by the abutting corner members at the cover ends of the adjacent cells 1, 1', 1", etc.

The corner members 5, represented in FIG. 4, are provided in their faces with openings 16 into which suitable shims, preferably of insulating material may be fitted when the space inside the rack is larger than the cells provided with those corner members.

As seen in FIG. 5, modified spacing means for the lower ends of the cells in the rack may be provided. In this figure, each cell casing bottom like that of the cell casing 2 is provided with a similar recess 2a', preferably at the center of which a teat 11' is secured as by welding and onto which teat a plastic plate 12' is force fitted. This plastic plate 12' has shape and thickness sufficient to provide wedging or spacing between the rack base plate c' and the cell bottom. The said plastic plate 12' is provided with lateral flange portions 12'a having cylindrically shaped openings 9' into which rods or appendices 10' of corner pieces $5^{IV}$ similar to corner pieces 5 may be positioned and secured so as to provide spacing corner pieces $5^{IV}$ at corners of each cell at its lower end. These corner pieces $5^{IV}$, like corner pieces 5 respectively space the cells from the lower side wall parts a' of the rack and from adjacent cells in the same way and to the same extent as corner pieces 5 at the upper ends of the respective cells. The plate 12' also is provided with longitudinal runner parts 18 which rest upon the rack base plate c'. In this way, the need for accurately located apertures 14 such as are provided in the rack base c is eliminated as is the need for the protuberance 15 of base plate 12 of FIG. 3. The spacing function of protuberance 15 and apertures 14 is effected instead by the corner members $5^{IV}$ carried by plate 12' which members serve effectively like corner members 5 to space the cells from the lower rack side wall a' and from each other by abutment with corner pieces $5^{IV}$ of adjacent cells.

Other suitable spacing means may be provided for the lower ends of the cell in the rack.

The materials of which the various parts according to the invention are made are, of course, selected so that they can withstand the physical conditions of operation and the chemical environment. As an example, discs 6 and members 5 and $5^{IV}$ may be made of polyamide and plates 12 and 12' and the shims of polypropylene.

In the case of a storage cell comprising only two terminal posts, two corner members 5 will be fastened to the same disc 6 such as is shown in FIG. 2.

It is to be understood that many variations and modifications may be made in the various embodiments of the present invention illustrated and described within the scope of the claims, more especially by substituting technically equivalent means, without departing from the scope of the invention.

What is claimed is:

1. The combination of a supporting rack, and a plurality of storage cells, each having terminal posts, and spacing means therefor, to form a battery in said supporting rack, each of said spacing means being secured independently of the others on the respective terminal posts of each cell for abutment with adjacent ones of said spacing means, independently mounted on terminal posts of adjacent cells, and adjacent lateral walls of said rack.

2. The combination according to claim 1 including means for spacing bottom ends of the cells from each other and rack parts.

3. The combination according to claim 2 wherein said last-named means includes a spacing plate positioned at the bottom of each cell.

4. The combination according to claim 3 wherein said spacing plate is secured to each cell and has a part thereof engageable in an aperture in a bottom part of said rack to prevent lateral and longitudinal displacement of the cells at their bottoms.

5. The combination according to claim 1 wherein said spacing means each comprise a corner member of insulating material, a ring-like insulating member fixedly mounted on a respective terminal post, and means for attaching said corner member respectively to said ring-like insulating member.

6. The combination according to claim 5 wherein said corner member has the shape of a trihedron.

7. The combination according to claim 1 wherein each of said spacing means comprises a trihedron-shaped corner member secured to a respective ring-like member carried on a respective one of said terminal posts.

8. The combination according to claim 7 wherein each of said spacing means also comprises a ring-like insulating member fixedly secured to a respective one of said terminal posts, each said ring-like insulating member having a flange provided with an opening, and each said corner member having an appendix that is housed and secured in said opening.

9. The combination according to claim 8 wherein the opening in the flange of each ring-like member serves to accommodate an appendix of each of two corner members.

10. The combination according to claim 1 including a sealing ring on each terminal post and wherein each of said spacing means comprises a ring-like member of insulating material superposed over the sealing ring, and means to secure each such ring-like member on the terminal post to which it is mounted and to compress the sealing ring on which it is superposed, to provide sealing for the cells at its terminal posts.

11. In a battery of adjacent cells having terminal posts mounted in a rack, spacing means mounted on such terminal posts to provide insulation between adjacent cells and lateral parts of the rack and also spacing between the cells for air circulation, said spacing means comprising corner members of insulating material engaged respectively by like corner members of adjacent cells and also engaging lateral parts of said rack, said corner members being secured to respective terminals of said cells, and means at the bottom of each cell for cooperation with a bottom part of the rack to prevent lateral and longitudinal displacement of lower ends of the cells as well as to space them from said bottom part.

12. In a battery of adjacent cells according to claim 11, in which each cell has a recess at its bottom, and a teat extending from said recess, said last-named means being secured on said teat and said last-named means having a protuberance engageable in an opening in said bottom part of said rack.

13. In a battery of adjacent cells having terminal posts mounted in a rack, spacing means mounted on such terminal posts to provide insulation between adjacent cells and lateral parts of the rack and also spacing between the cells for air circulation, and means at the bottoms of each cell for cooperation with a bottom part of the rack to prevent lateral and longitudinal displacement of lower ends of the cells as well as to space them from said bottom part, said last-named means including a plate-like member secured to the lower end of each cell, and means for mounting and securing corner members thereto.

14. In a battery according to claim 13 each plate-like member secured to the lower end of each cell including an apertured flange in whose aperture a corner member appendix is mountable, each said plate-like member being provided with longitudinal runner parts resting upon the bottom part of said rack.

15. The combination of a supporting rack, a plurality of cells, each cell having a casing and cover with terminal posts extending outwardly of the cover to form a battery in said supporting rack, independent spacing means securely mounted on respective ones of said terminal posts of each cell, externally of its cover, for abutment with adjacent similarly mounted spacing means on adjacent cells, and also with lateral parts of said rack, to provide insulation between adjacent cells as well as spacing for circulation of air; and means at the bottom ends of each cell casing for spacing it from a bottom part of said rack and preventing lateral and longitudinal displacement of the bottom end of each cell relative to adjacent cells and to said bottom part of said rack.

16. The combination according to claim 15 wherein each cell casing is generally of parallelepiped shaped and said spacing means each comprise a corner member having the shape of a trihedron, respective faces of which abut lateral walls of said rack and adjacent corresponding faces of adjacent corner members.

17. The combination of a storage cell of substantially parallelepiped shape, which has terminal posts for making electrical connection thereto, and a plurality of cell spacing means, each independently secured to a respective terminal post, each of said means comprising a corner member of insulating material, a ring-like insulating member fixedly mounted on a respective terminal post and means for attaching said corner member respectively to said ring-like member, the combination being so constructed and arranged that when said cell is mounted in a battery supporting rack, said spacing means spaces the walls of said cell from adjacent walls of said rack and from adjacent cells mounted therein.

18. The combination according to claim 17 wherein each of said corner members has the shape of a trihedron.

19. The combination according to claim 18 wherein each of said ring-like members has a flange provided with an opening, and wherein each of said corner members has an appendix that is housed and secured in said opening.

20. The combination according to claim 19 wherein said opening in said flange serves to accommodate an appendix of each of two corner members.

References Cited
UNITED STATES PATENTS

| | | | |
|---|---|---|---|
| 1,313,384 | 8/1919 | Hutchinson et al. | 136—181 |
| 754,858 | 3/1904 | Edison | 136—166 |
| 673,678 | 5/1901 | Chamberlain et al. | 136—181 |
| 1,304,588 | 5/1919 | Monahan | 136—171 |
| 1,364,390 | 1/1921 | Lyndon | 136—181 |
| 1,364,358 | 1/1921 | Edison | 136—181 |

DONALD L. WALTON, Primary Examiner

U.S. Cl. X.R.

136—181